(12) United States Patent
Amanullah et al.

(10) Patent No.: US 11,407,956 B1
(45) Date of Patent: Aug. 9, 2022

(54) LUBRICANT FORMULATION FOR MULTIPLE WATER-BASED MUDS

(71) Applicant: SAUDI ARABIAN OIL COMPANY, Dhahran (SA)

(72) Inventors: Md Amanullah, Dhahran (SA); Jothibasu Ramasamy, Dhahran (SA); Ali Radhwan, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/181,447

(22) Filed: Feb. 22, 2021

(51) Int. Cl.
*C10M 105/24* (2006.01)
*C10M 105/36* (2006.01)
(Continued)

(52) U.S. Cl.
CPC .......... *C10M 105/24* (2013.01); *C09K 8/145* (2013.01); *C09K 8/206* (2013.01); *C09K 8/24* (2013.01);
(Continued)

(58) Field of Classification Search
CPC ... C10M 105/24; C10M 105/36; C09K 8/145; C09K 8/206; C09K 8/24; C09K 2208/34;
(Continued)

(56) References Cited

U.S. PATENT DOCUMENTS 5,834,533 A * 11/1998 Patel .................... C10M 125/18
523/130
8,563,482 B2 10/2013 Amanullah
(Continued)

FOREIGN PATENT DOCUMENTS

CN 104371674 A 2/2015
WO 2010065634 A2 6/2010

OTHER PUBLICATIONS

Acme-Hardesty Caprylic/Capric Acid Specifications, retrieved from the Internet Archive at https://web.archive.org/web/20160326141606/https://www.acme-hardesty.com/product/capryliccapric-acid-c810/ on Nov. 30, 2021. (Year: 2016).*

(Continued)

*Primary Examiner* — James C Goloboy
(74) *Attorney, Agent, or Firm* — Osha Bergman Watanabe & Burton LLP

(57) ABSTRACT

Provided is a lubricant, which may include a mixture of alkyl-esterified fatty acids from waste vegetable oil and a C8/C10 fatty acid blend. The C8/C10 fatty acid blend may include a caprylic fatty acid (C8) and a capric fatty acid (C10). Provided is a method of preparing a lubricant, which may include providing alkyl-esterified fatty acids from waste vegetable oil and a C8/C10 fatty acid blend, and mixing them such that a homogeneous lubricant composition forms. Further provided is a water-based mud, which may include an aqueous base solution and a lubricant composition. Further provided is a method off preparing the water-based mud, which may include providing an aqueous base solution and a lubricant composition and mixing them such that the water-based mud forms. Further provided is a method of using a water-based mud, which may include introducing into a wellbore the water-based mud comprising a lubricant composition.

20 Claims, 3 Drawing Sheets

(51) Int. Cl.
*C09K 8/24* (2006.01)
*C09K 8/14* (2006.01)
*C09K 8/20* (2006.01)
*C10N 70/00* (2006.01)
*B01F 23/40* (2022.01)
*B01F 23/70* (2022.01)

(52) U.S. Cl.
CPC ......... *C10M 105/36* (2013.01); *B01F 23/405* (2022.01); *B01F 23/711* (2022.01); *C09K 2208/34* (2013.01); *C10N 2070/00* (2013.01)

(58) Field of Classification Search
CPC ... C10N 2070/00; B01F 3/0803; B01F 3/2078
See application file for complete search history.

(56) References Cited

U.S. PATENT DOCUMENTS

| | | |
|---|---|---|
| 2013/0190544 A1 | 7/2013 | Wang et al. |
| 2014/0303057 A1 | 10/2014 | Abhari et al. |
| 2015/0322325 A1* | 11/2015 | Amanullah .............. C09K 8/16 175/65 |
| 2017/0009180 A1 | 1/2017 | Chen et al. |
| 2017/0051219 A1 | 2/2017 | Knuth et al. |
| 2017/0137689 A1 | 5/2017 | Deroo |
| 2019/0276725 A1 | 9/2019 | Ramasamy et al. |
| 2020/0024499 A1 | 1/2020 | Amanullah et al. |
| 2020/0024500 A1 | 1/2020 | Ramasamy et al. |
| 2020/0133224 A1* | 4/2020 | Popp .................... G05B 19/056 |
| 2020/0157403 A1 | 5/2020 | Ramasamy et al. |
| 2020/0190351 A1* | 6/2020 | Golodetz ............. C09D 17/001 |

OTHER PUBLICATIONS

Amanullah, Md and Mohammed K. Arfaj, "ARC Eco-Lube—A Food Industry Waste-Based Green Lubricant", SPE-188910-MS, Society of Petroleum Engineers, Nov. 2017, pp. 1-15 (15 pages).

* cited by examiner

LUBRICANT FORMULATION FOR MULTIPLE WATER-BASED MUDS

BACKGROUND

Drilling fluid or drilling "mud" is a prevailing component of various compositions used in downhole operations. The drilling mud performs multiple functions, one of which is acting as a lubricant. The mud lubricates rotating components of a drill string as well as between the drill string and wellbore wall. Without a lubrication effect of the drilling fluid, tools may stick to the wellbore wall, that is, friction can build up between mudcake that forms on the wellbore wall and the drill string that may further result in sticking.

SUMMARY

The foregoing general description and the following detailed description are exemplary and are intended to provide an overview or framework for understanding the nature of what is claimed.

In one aspect, one or more embodiments relate to a lubricant, which may comprise a mixture of alkyl-esterified fatty acids from waste vegetable oil and a C8/C10 fatty acid blend comprising a caprylic fatty acid (C8) and a capric fatty acid (C10).

In one aspect, one or more embodiments relate to the lubricant, wherein the alkyl-esterified fatty acids from the waste vegetable oil may be at a volume percent of from about 50% to about 90% of the lubricant.

In one aspect, one or more embodiments relate to the lubricant, wherein the C8/C10 fatty acid blend may be at a volume percent of from about 10% to about 50% of the lubricant.

In one aspect, one or more embodiments relate to the lubricant, wherein the C8/C10 fatty acid blend may be at a volume percent of from about 10% to about 50% of the lubricant.

In one aspect, one or more embodiments relate to the lubricant, wherein the caprylic fatty acid (C8) may be from about 50% by volume to about 60% by volume of the C8/C10 fatty acid blend.

In one aspect, one or more embodiments relate to the lubricant, wherein the capric fatty acid (C10) may be from about 40% by volume to about 50% by volume of the C8/C10 fatty acid blend.

In one aspect, one or more embodiments relate to the lubricant, wherein the waste vegetable oil may be recycled waste vegetable oil.

In one aspect, one or more embodiments relate to the lubricant, wherein the mixture may have a viscosity in a range of from about 1 centistoke (cSt) to about 20 cSt.

In one aspect, one or more embodiments relate to the lubricant, wherein the mixture may have a moisture content of less than about 1%.

In one aspect, one or more embodiments relate to the lubricant, wherein the mixture may have an acid content of less than about 1.5 mg KOH/g oil (milligram of potassium hydroxide per gram of oil).

In one aspect, one or more embodiments relate to the lubricant, wherein the C8/C10 fatty acid blend may be homogenized.

In another aspect, one or more embodiments relate to a method of preparing a lubricant, which may comprise providing alkyl-esterified fatty acids from waste vegetable oil. The method may further include providing a C8/C10 fatty acid blend, comprising a caprylic fatty acid (C8) and a capric fatty acid (C10). The method may further include mixing the C8/C10 fatty acid blend into the alkyl-esterified fatty acids from the waste vegetable oil such that a homogeneous lubricant composition forms.

In one aspect, one or more embodiments relate to the method, wherein the C8/C10 fatty acid blend may be a homogeneous blend provided by blending at low shear and 60° C. heating temperature. The C8/C10 fatty acid blend may be at a volume percent in a range of from about 10% to about 50% of the lubricant. The caprylic fatty acid (C8) may be in a range from about 50% to about 60% by volume of the C8/C10 fatty acid blend. The capric fatty acid (C10) may be in a range from about 40% to about 50% by volume of the C8/C10 fatty acid blend. The alkyl-esterified fatty acids from waste vegetable oil may be at a volume percent in a range of from about 50% to about 90% of the lubricant.

In one aspect, one or more embodiments relate to the method, wherein the mixing may occur at a shear rate in a range of from 1 to 6 rpm, and at a temperature of about 80° C.

In yet another aspect, one or more embodiments relate to a water-based mud. Which may comprise an aqueous base solution and a lubricant composition. The lubricant composition may comprises a mixture of a fatty acid blend and alkyl-esterified fatty acids from waste vegetable oil, and the fatty acid blend may comprise caprylic fatty acid (C8) and a capric fatty acid (C10).

In one aspect, one or more embodiments relate to the water-based mud, where the lubricant composition may be present in a range of from about 1% to 5% by volume of the water-based mud.

In one aspect, one or more embodiments relate to the water-based mud, where the aqueous base solution may be selected from the group consisting of a clay-based bentonite mud, a salt-free polymer-based mud, a monovalent salt-containing polymer mud, and a divalent salt-containing polymer mud.

In one aspect, one or more embodiments relate to the water-based mud, which may further comprise an additive. The additive may be selected from the group consisting of a polymer, an acid, a base, a mineral, a clay, a salt, and combinations thereof.

In one aspect, one or more embodiments relate to the water-based mud, where the aqueous base solution may have a coefficient of friction and the water-based mud may have a coefficient of friction. The coefficient of friction for the water-based mud may be at least 75% less than the coefficient of friction for the aqueous base solution. The coefficient of friction for the water-based mud may be at least 79% less than the coefficient of friction for the aqueous base solution.

In a further aspect, one or more embodiments relate to a method of preparing a water-based mud, which may comprise providing an aqueous base solution and providing a lubricant composition. The lubricant composition may comprise alkyl-esterified fatty acids from waste vegetable oil and a fatty acid blend, where the fatty acid blend may comprise caprylic fatty acid (C8) and a capric fatty acid (C10). The method may include mixing the aqueous base solution and the lubricant composition such that the water-based mud forms.

In yet a further aspect, one or more embodiments relate to a method of using a water-based mud, which may comprise introducing into a wellbore the water-based mud comprising a lubricant composition. The water-based mud comprises an aqueous base solution and the lubricant composition, where the lubricant composition may comprise an alkyl-esterified fatty acids from waste vegetable oil and a fatty acid blend, and where the fatty acid blend may comprise a caprylic fatty acid (C8) and a capric fatty acid (C10).

BRIEF DESCRIPTION OF DRAWINGS

The following is a description of the figures in the accompanying drawings. The accompanying drawings are included to provide further understanding and are incorporated in and constitute a part of the specification. The drawings illustrate one or more embodiments and together with the description explain compositions of a lubrication fluid, a method of manufacturing the lubrication fluid, a drilling fluid using the lubrication fluid, and a method of use of the drilling fluid with the lubrication fluid.

DETAILED DESCRIPTION

Figure 1:
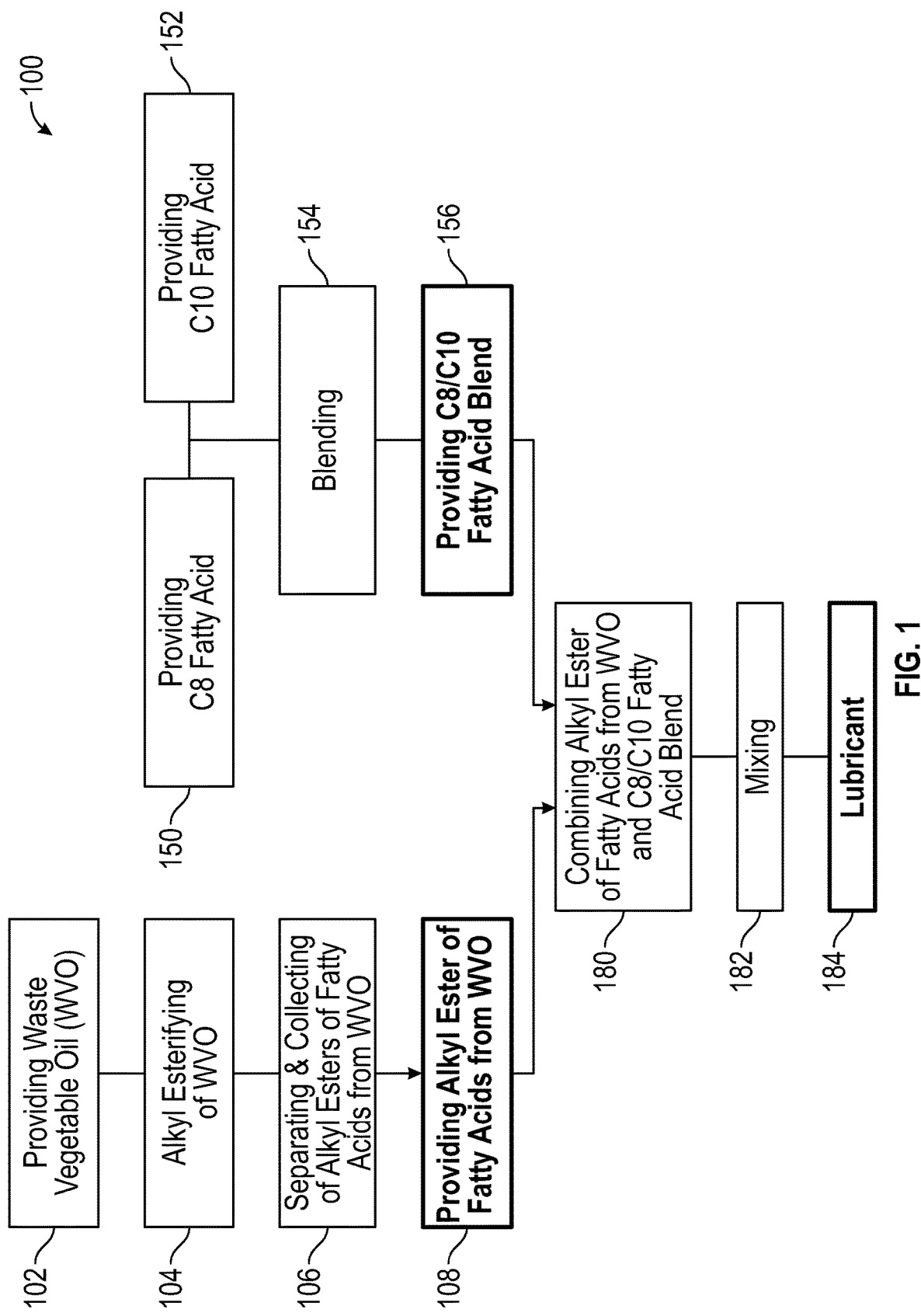
FIG. 1 depicts a block diagram showing the manufacturing process of a lubricant, in accordance with one or more embodiments.

In the following Detailed Description, details are set forth to provide a thorough understanding of one or more disclosed implementation and embodiment. However, one skilled in the relevant art will recognize that one or more implementation and embodiment may be practiced without one or more of these details, or with other methods, components, materials, and so forth.

Conventional lubricants may be added to water-based drilling fluid as mud additives to increase a lubrication effect compared to the lubrication effect of the drilling fluid alone. However, conventional lubricants may not function as designed in some instances. For example, conventional lubricants may be rendered inoperable in monovalent and divalent salt-containing water-based muds. Conventional lubricants may degrade in HPHT sections of a borehole. Conventional lubricants may not provide sufficient torque and drag reduction, compared to the same lubricants' performance in water-based muds that do not include monovalent or divalent salts or are not in HPHT sections of a wellbore. Consequently, conventional lubricant mud additives may generally be developed for use in a single type of mud system and may be of limited use.

"HPHT" or "high pressure/high temperature" in describing wellbore conditions may include pressures of greater than or equal to 15,000 pounds per square inch (psi), bottomhole temperatures of greater than or equal to 150° C., or a combination of both.

One or more embodiments of the present disclosure provide a lubricant composition, drilling mud composition, and method of use thereof. One or more embodiments of the lubricant composition includes a blend of fatty acids, such as caprylic fatty acid ("C8" or "octanoic") and capric fatty acid ("C10" or "decanoic"), with an alkyl-esterified waste vegetable oil. An "alkyl-esterified waste vegetable oil" is a waste vegetable oil that has one or more ingredients modified to create an alkyl-esterified fatty acid. An "alkyl-esterified fatty acid" is a fatty acid that has a hydrogen atom of a carboxylic acid functional group replaced by an alkyl group. One or more embodiments of the drilling mud composition is a formulation that includes a lubricant composition as an additive (ingredient). In one or more embodiments, the drilling mud composition is an aqueous base solution. One or more drilling mud composition embodiments may include the following water-based muds: clay-based mud, salt-free polymer-based mud, monovalent salt-containing mud, and divalent salt-containing mud.

In general, one or more embodiments of lubricant composition, drilling mud composition, and its method of use provide an effect of decreased torque and drag in multiple water-based muds (including monovalent and divalent salts), and at HPHT conditions, compared to water-based muds using conventional lubricants or having no lubricant.

"Torque" is the force to rotate the drill string downhole, including the pipe, assembly, and other components. "Drag" is the force to move the pipe up or down in the well bore.

In some instances, a reduction in torque and drag provides for a minimized coefficient of friction (COF) and reduced wear on, for example, rotating downhole tools. By reducing wear on rotating downhole tools, drilling efficiency may be improved, such as by increasing a rate of penetration, versus a system without reduction in torque and drag.

One or more embodiments of lubricant composition, drilling mud composition, and its method of use further provide oxidative, chemical, and antimicrobial stability, hygienic rig site working conditions, and protection against mechanical degradation of sized bridging materials and lost circulation material.

An example of providing chemical stability, for example, includes but is not limited to stability of a lubricant composition that may form insoluble particles in the presence of (or in contact with) monovalent and divalent salts. Without wanting to be bound by theory, lubricant composition (in a liquid) containing fatty acids and esters of fatty acids may create insoluble particles such as monovalent and divalent ionized pairs (such as soaps) and may separate from the drilling mud composition. Separation of ionized salt pairs may lead to a reduction in lubricating efficiency of the lubricant composition compared to a lubricant composition that does not include a monovalent salt, divalent salt, or monovalent and divalent salt.

Lubricant Composition

One or more embodiments of a lubricant composition includes a mixture of alkyl-esterified fatty acids from waste vegetable oil with a blend of caprylic fatty acid (C8) and capric fatty acid (C10).

Without being bound by theory, the presence of longer-chain C10 fatty acids in the mixture may provide improved torque and drag reduction compared to a mixture having fatty acid carbon chain lengths of less than ten carbons. Fatty acids having a carbon chain of six carbons or less are not included in one or more embodiments of the disclosed lubricant composition.

When mixed with alkyl-esterified fatty acids of waste vegetable oil, the longer-chain C10 fatty acids of the C8 and C10 ("C8/C10") fatty acid blend may improve mechanical lubrication compared to a fatty acid blend having fatty acids of less than ten carbons. Although not wanting to be bound by theory, it is believed that one or more embodiments of the lubricant composition forms a lubrication layer on solid mud additives and particles in the wellbore fluid, such as on cuttings and debris. The lubrication layer improves impact resistance between downhole equipment, especially rotating equipment by forming a "cushioning" lubrication layer around the equipment and the particles. The lubrication layer also prevents such solid mud additives and particles from being damaged or degraded by rotating equipment by creating reduced friction between the two. This may afford for easier transport up and out of the wellbore and filtration from the drilling mud composition.

When mixed with the alkyl-esterified fatty acids of waste vegetable oil, the longer-chain C10 fatty acids of a C8/C10 fatty acid blend may improve antimicrobial properties of a composition compared to a fatty acid blend having fatty acids of less than ten carbons. Without being bound by theory, the C10 fatty acids may prevent microbial or bacterial degradation of polymers in water-based drilling mud compositions compared to a composition without C10 fatty acids. When polymers, such as biopolymers, are included in an water-based mud provided as an aqueous base solution, C10 fatty acids are believed to inhibit bacterial and fungal growth potential. Some examples of biopolymers that may be used in water-based mud include, but are not limited to, starches, such as modified potato starch or corn starch, *Xanthomonas campestris* polymers (XC polymers or xanthan gum), and psyllium husks (psyllium seed husks). By inhibiting bacterial and fungal growth, the functional capability of a water-based mud including C10 fatty acids may be maintained for a longer period versus a water-based mud that utilizes fatty acids of less than 10 carbons.

Lubricant Composition: Alkyl-Esterified Fatty Acids of Waste Vegetable Oil

In one or more embodiments, alkyl-esterified fatty acids of waste vegetable oil are a component of the lubricant composition. Alkyl-esterified fatty acids are generally derivatives of fatty acids where a fatty acid carboxylic acid or carboxylate functional group has been modified to an alkyl-ester. Such alkyl-ester derivatives of fatty acids are well known to those of ordinary skill in the art.

In one or more embodiments, the alkyl-esterified fatty acids of waste vegetable oil comprise alkyl-esters of fatty acids originating from waste vegetable oil. In one or more embodiments, the alkyl-esterified fatty acids of waste vegetable oil consist essentially of alkyl-esters of fatty acids originating from waste vegetable oil. In one or more embodiments, the alkyl-esterified fatty acids of waste vegetable oil consists of alkyl-esters of fatty acids originating from waste vegetable oil.

In one or more embodiments, waste vegetable oil is used as a starting reagent to form an alkyl-esterified waste vegetable oil. "Alkyl-esterified waste vegetable oil" means that one or more ingredients in the waste vegetable oil has been modified to form alkyl-esterified fatty acids. Modifications may be classified as synthetic, natural, chemical, or biological modification, or a combination thereof. Waste vegetable oil starting reagent may be a used, processed, or recycled vegetable oil. The waste vegetable oil provides an eco-friendly and sustainable starting reagent for the lubricant composition that can be obtained from various industries, for example, the food industry. The waste vegetable oil may be obtained from another suitable industry including, but not limited to, the chemical, cosmetic, farming, tobacco, and ethanol or biodiesel industries. Waste vegetable oil may include multiple sources of waste vegetable oil that are mixed together. Waste vegetable oil may come from used (formerly "fresh" or unused) vegetable oil. Vegetable oil may include but is not limited to oil that is commonly used for cooking, for example, olive oil, palm oil, rapeseed oil, sunflower oil, corn oil, peanut oil, sesame oil, coconut oil, "vegetable" (a blend of a variety of homogenized oils of plants) oil, and mixtures thereof. Vegetable oil commonly used for cooking are also known as frying oils. Vegetable oil that has not been used but that is classified as waste or recycled waste vegetable oil may be used. Such examples of unused vegetable oil that is waste or recycled includes, but is not limited to, manufactured raw materials that have been rejected and labelled as waste (or is past its expiration date). Generally, a quality check is performed to qualify a waste vegetable oil for its environmental suitability before use, that is, to determine if the waste vegetable oil will not harm or damage the downhole environment. Examples of such quality checks for vegetable oil are known to one of ordinary skill in the art.

Optionally, the used or waste vegetable oil may include a portion of fresh, vegetable, virgin, or other unused vegetable oil that has been heated to elevated temperatures (temperatures greater than ambient) or stored for a prolonged period. The waste vegetable oil may have been exposed to the presence of air or oxygen or may be stored under inert conditions. After an oil has been stored or heated for a prolonged period or exposed to other materials, such as food or chemicals, an acid level of the vegetable oil (and glycerol level) may increase due to known degradation processes.

In one or more embodiments, the waste vegetable oil may be "blended down" with unused or unprocessed vegetable oil, such as fresh, vegetable, virgin, raw or other unused oils, before esterification. In one or more embodiments, the amount of unused or unprocessed vegetable oil will be a minority component of the composition; waste vegetable oil will comprise more than 50% by volume of the vegetable oil composition.

Waste vegetable oil may have had non-oil materials introduced into the oil during its use, such as food or metal debris.

Generally, waste vegetable oil may be a mixture including glycerides extracted from a plant, such as monoglycerides, diglycerides, and triglycerides. A glyceride is an ester of glycerol and a fatty acid, where examples of glycerides are well-known in the art. Depending on the source, vegetable oil includes a mixture of different types of fatty acids attached to a glycerol functionality as well as free native fatty acids and fat-soluble ingredients.

The waste vegetable oil may include, but is not limited to, combinations of omega 3, omega 6, and omega 9 fatty acids; lipids; terpenoids; vitamin E derivatives, such as tocopherols and tocotrienols; and steroids and steroid derivatives, such as phytosterols and phytosterol esters.

The waste vegetable oil generally includes ingredients that may be fat soluble and may not include, for example, insoluble particles, such as insoluble salts, insoluble aqueous-soluble remnants, or other materials not soluble in either oil or water.

The waste vegetable oil may include saturated and unsaturated fats and glycerides (such as triglycerides). For example, the waste vegetable oil may include a ratio of saturated fats to unsaturated fats in a range of from about 75:25 to 25:75 saturated to unsaturated.

The length, branching, and saturation of fatty acid chains in the waste vegetable oil (such as in free fatty acids or fatty acid derivatives, like glycerides) are not particularly limited. The fatty acid chains may be saturated, monounsaturated, polyunsaturated, and combinations thereof. The saturation content (percent saturation) may change (increase or decrease) from the original vegetable oil to the waste vegetable oil. Although not wanting to be bound by theory, it is believed that due to the heat exposure history of the waste vegetable oil (and the fatty acids included therein) has a decreased number of unsaturated sites versus unheated and unused vegetable oil. In some instances, a saturation content may remain the same. Without wanting to be bound by theory, it is believed that high oleic olive oil may provide oxidative stability when included in a waste vegetable oil (or a mixture thereof), compared to a waste vegetable oil without high oleic olive oil. In one or more embodiments, a high oleic oil may be included as a waste vegetable oil. In one or more embodiments, a waste vegetable oil or a mixture thereof may include an oleic acid content of 40% or greater. A "high oleic olive oil" is an olive oil that includes an oleic acid content that has more than 70% volume of oleic acid by total volume. In one or more embodiments, high oleic olive oil includes an oleic acid content ranging from 70 to 80% by volume, from 70 to 90% by volume, and 70 to 99% by volume. The waste vegetable oil may be in a solid or liquid state, or both, prior to use. Waste vegetable oils may include but are not limited to ingredients found in vegetable oil.

An average carbon chain length of fatty acid functionalities of the waste vegetable oil is not particularly limited. The carbon chain length of the fatty acids available generally depends on which vegetable oil the fatty acids originated. In one or more embodiments, the average carbon chain length of fatty acid functionalities of the waste vegetable oil is greater than an average carbon chain length included in the remainder of the lubricant. For example, the average carbon chain length of fatty acid functionalities in the esterified waste vegetable oil may be greater than an average carbon chain length in a blend of C8 and C10 fatty acids. In one or more embodiments, the average carbon chain length of the fatty acids in the waste vegetable oil may be in a range of from about 8 to about 40 carbons, such as 8 to 38 carbons, such as 9 to 38 carbons, such as 10 to 38 carbons, such as 8 to 24 carbons, such as 9 to 24 carbons, such as 10 to 24 carbons, such as 8 to 16 carbons, such as 9 to 16 carbons, such as 10 to 16 carbons, such as 8 to 12 carbons, such as 9 to 12 carbons, such as 10 to 12 carbons, such as 8 to 10 carbons, and such as 9 to 10 carbons.

Many reactions and processes that may form an ester are known in the art. In one or more embodiments, the waste vegetable oil is not particularly limited in composition so long as it includes fatty acids functionalities that can be esterified with alkyl groups. An alkyl-esterified fatty acid from waste vegetable oil may result from an esterification reaction or may otherwise be provided as an alkyl-ester. Such alkyl-esterified fatty acids may be called fatty acid esters.

Prior to forming an alkyl-esterified fatty acid, waste vegetable oil that includes glycerides and other esters may be partially or fully lysed, such as from lipolysis or hydrolysis, to form fatty acids. Further, prior to forming an alkyl-esterified fatty acid, waste vegetable oil may include free native fatty acids that are not obtained from lipolysis or hydrolysis. Upon forming an alkyl-esterified fatty acid from the waste vegetable oil, lipolyzed or hydrolyzed fatty acids, free fatty acids, or both lipolyzed or hydrolyzed fatty acids and free fatty acids, may be esterified. In instances where free fatty acids are esterified, glycerides in the waste vegetable oil may remain intact during esterification.

Prior to esterification, impurities may be removed from the waste vegetable oil. Such impurities may include, but are not limited to, food wastes and metal particles. In one or more embodiments, glycerol and other non-fatty acids are removed to purify the waste vegetable oil-originating fatty acids. In general, impurities may be components that can reduce the functional capability of the alkyl-esterified fatty acids of waste vegetable oil. Impurities and other select components can further be removed from the waste vegetable oil using methods known to one of ordinary skill in the art.

Removal of impurities and other select components present in the waste vegetable oil or the alkyl-esterified waste vegetable oil may be done by any method known in the art. As a non-limiting example, burnt or charred food and remnant organic matter may be removed by filtration from waste vegetable oil, such as frying oil that is obtained from the food industry. The filtration means may include, but is not limited to, filter paper; synthetic filter; natural or synthetic fiber; silica or alumina frits; and membranes, for example, dialysis bags. In general, filtration pore sizes less than 5 micrometers (μm) may remove impurities larger than 5 μm. Filtration can use gravitational, vacuum assistance, or pressurization. Other filtration media or adsorbents that can remove impurities and excess water from the waste vegetable oil may be used as alternatives or in addition to the low-pressure filtration cell. For example, a multi-cell filtration apparatus can remove the impurities. Waste vegetable oil purification may include, for example, decanting after sedimentation, washing, and extracting, and other methods of purification. Other general purification methods that may remove impurities include, but are not limited to, extraction, distillation, various chromatography methods, dialysis, osmosis, fractionation, centrifugation, sublimation, crystallization, precipitation, and partitioning.

Esterification of waste vegetable oil to form alkyl-esterified fatty acids of waste vegetable oil is a result of a commensurate set of chemical reactions or other general reactions that provide the alkyl ester product. The alkyl-esterified fatty acids of waste vegetable oil may be separated, purified, and collected. In other instances, the alkyl esterified fatty acids may remain as an unpurified crude material.

The waste vegetable oil may be esterified in the presence of a catalyst to produce alkyl-esterified fatty acids of waste vegetable oil. The catalyst can include one or more basic (pH) catalyst, such as sodium hydroxide, potassium hydroxide, sodium alkoxide, potassium alkoxide, and combinations thereof. Various other classes of basic (pH) catalysts may be used, for example, organometallic bases and lithium bases. The catalyst can alternatively include one or more acid (pH) catalyst, for example, one or more of an Arrhenius acid, a Brønsted acid, and a Lewis acid.

Lubricant Composition: Alkyl Alcohols

When esters are formed from fatty acids in the waste vegetable oil (whether free native fatty acids or fatty acids that have been freed by lipolysis/hydrolysis), alkyl alcohols may be included. An alkyl alcohol is an alcohol with alky group, that is, a carbon chain that is fully saturated. In one or more embodiments, an alkyl alcohol may include short-chain alcohols, including, but not limited to, methanol, ethanol, propanol, butanol, or a combination thereof.

In some instances, a small amount of remnant alkyl alcohols may be present in the lubricant. These remnant alkyl alcohols may be left over from, for example, an esterification process, or by the esters themselves that may revert from final product back to starting material (via known equilibrium processes) over time. In one or more embodiments, less than 3% of the lubricant (volume) contains alkyl alcohols.

The alkyl alcohol may be used to form an alkoxy group. The term "alkoxy" as used refers to an oxygen atom connected to an alkyl group, including a cycloalkyl group.

Examples of linear alkoxy groups include, but are not limited to, methoxy, ethoxy, propoxy, butoxy, pentyloxy, and hexyloxy. Examples of branched alkoxy include, but are not limited to, isopropoxy, sec-butoxy, tert-butoxy, isopentyloxy, and isohexyloxy. Examples of cyclic alkoxy include, but are not limited to, cyclopropyloxy, cyclobutyloxy, cyclopentyloxy, and cyclohexyloxy. An alkoxy group may include a number of carbon atoms in a range of from 1 to 40 carbon atoms bonded to the oxygen atom, such as 8 to 40 carbon atoms, 12 to 40 carbon atoms, 1 to 30 carbon atoms, 8 to 30 carbon atoms, 12 to 30 carbon atoms, 1 to 20 carbon atoms, 8 to 20 carbon atoms, 12 to 20 carbon atoms, 1 to 16 carbon atoms, 4 to 16 carbon atoms, 6 to 16 carbon atoms, 8 to 16 carbon atoms, and 12 to 16 carbon atoms.

In one or more embodiments, the alkoxy group may further include double or triple carbon-carbon bonds. In one or more embodiments, the alkoxy group may further include heteroatoms. For example, an allyloxy group is an alkoxy group within the meaning in this disclosure. A methoxyethoxy group is also an alkoxy group within the meaning in this disclosure, as is a methylenedioxy group in a context where two adjacent atoms of a structure are substituted. In one or more embodiments, the alkoxy group of the alkyl-esterified fatty acids of waste vegetable oil is a methoxy group, an ethoxy group, a propoxy group, or a combination thereof.

Lubricant Composition: C8/C10 Fatty Acid Blend

In one or more embodiments, the lubricant composition includes a caprylic (C8) fatty acid and capric (C10) fatty acid blend, which is a "C8/C10 fatty acid blend". In one or more embodiments, the C8/10 fatty blend comprises both C8 fatty acid and C10 fatty acid. In one or more embodiments, the C8/10 fatty blend consists essentially of both C8 fatty acid and C10 fatty acid. In one or more embodiments, the C8/10 fatty blend consists of both C8 fatty acid and C10 fatty acid.

In one or more embodiments, the C8/C10 fatty acid blend may comprise C8 fatty acid in a range of from about 50% to about 60% by volume. In one or more embodiments, the C8/C10 fatty acid blend may comprise C10 fatty acid in a range of from about 40% to about 50% by volume. For example, the C8/C10 fatty acid blend may comprise 55% by volume of C8 fatty acid and 45% by volume C10 fatty acid.

The C8/C10 fatty acid blend is provided as part of the method of forming the lubricant of one or more embodiments. In some instances, separate amounts of C8 fatty acid and C10 fatty acid are blended to provide the C8/C10 fatty acid blend. In other instances, a pre-blended C8/C10 fatty acid blend is provided and used. In one or more embodiments, the C8/C10 fatty acid blend is a liquid. In other instances, the C8/C10 fatty acid blend may be liquefied, for example, by heating, blending, dissolving, or solvating. In one or more embodiments, the caprylic or capric fatty acid starting materials have a purity of greater than 95% (by volume).

Lubricant Composition: Mixture of Alkyl-Esterified Waste Vegetable Oil and C8/C10 Fatty Acid Blend In one or more embodiments, the lubricant composition includes alkyl-esterified waste vegetable oil at a volume percent in a range of from about 50% to about 90% of the lubricant, such as from about 60% to about 80%, from about 65% to about 75%, and from about 65% to about 70%. In one or more embodiments, the lubricant composition includes C8/C10 fatty acid blend at a volume percent in a range of from about 10% to about 50%, such as from about 20% to about 40%, from about 25% to about 35%, and from about 30% to about 35%. In one or more embodiments, the alkyl-esterified waste vegetable oil is about 67% by volume and the C8/C10 fatty acid blend is about 33% by volume of the lubricant composition.

In one or more embodiments, the lubricant comprises a mixture of alkyl-esterified waste vegetable oil and the C8/C10 fatty acid blend. In one or more embodiments, the lubricant consists essentially of a mixture of alkyl-esterified waste vegetable oil and the C8/C10 fatty acid blend. In one or more embodiments, the lubricant consists of a mixture of alkyl-esterified waste vegetable oil and the C8/C10 fatty acid blend.

Mixture Properties

The overall lubricant mixture has several useful properties as a lubricant. In one or more embodiments, the overall lubricant mixture may a viscosity of less than 20 centistokes (cSt), such as in a range of from about 0 cSt to about 20 cSt, from about 1 cSt to about 20 cSt, from about 2 cSt to about 20 cSt, from about 3 cSt to about 20 cSt, from about 4 cSt to about 20 cSt, or from about 5 cSt to about 20 cSt. The viscosity of the overall lubricant is substantially similar to that of mineral oil. In one or more embodiments, the overall lubricant mixture may have a moisture content of about 1% or less, such as less than about 1%. In one or more embodiments, the overall lubricant mixture may have an acid content of less than 1.5 milligrams of potassium hydroxide per gram of oil (mg KOH/g oil), such as in a range from about 0.05 mg KOH/g oil to about 1.5 mg KOH/g oil. An "acid content" is a content (value) of acid functional groups including, but not limited to, carboxylic acids and is a term known in the field.

Coefficient of Friction

A coefficient of friction (COF) is generally defined as a ratio of force between two materials and force bringing the two materials together. Coefficient of friction values are dimensionless ratios and measure lubricity, for example, between a drilling fluid and a solid material. Lubricity directly relates to torque and drag: when the lubricity of a fluid increases, torque and drag decrease.

Base Drilling Fluids

Base drilling fluids are water-base drilling fluids (muds). The disclosed lubricant composition of one or more embodiments may be used in several types of water-based muds, including, but not limited to, bentonite muds, such as clay-based bentonite mud; polymer muds, such as salt-free polymer-based mud; salt-containing muds, such as monovalent salt-containing mud and divalent salt-containing mud; salt-free muds; and combinations thereof. The aforementioned water-based muds may be used as water-base drilling fluids.

The base drilling fluid includes water. Water used in the base drilling fluid may include fresh and potable waters from surface sources (lakes, rivers, swamps), subterranean sources (aquifers), and synthetic sources (desalinization, boiler feed); synthetic and natural sea water; brackish water; synthetic or natural brines; formation water; production water; gray, black, blue, and brown waters; storm runoff; agricultural waste and runoff; chemical process water; reverse-osmosis retentate; mining slurries; and combinations thereof.

In one or more embodiments, the water may include small amounts of dissolved or sparingly soluble mineral solids. In one or more embodiments, the water may include small amounts of dissolved or sparingly soluble salt solids. In one or more embodiments, the water may include small amounts of organic materials, including biological materials, as long as the amount and material does not negatively impact the function of the water-based mud or the lubricant.

The base drilling fluid may include compounds that are suspended or emulsified in the base drilling fluid. Any of the base drilling fluid may further include one or more additive, such as thickeners, deflocculants, lubricants, shale inhibitors, fluid loss additives, and weighting agents. In one or more embodiments, an additive is added to the base drilling fluid. An additive includes, but is not limited to, a clay, a polymer, an acid, a base, a mineral, a salt, and other forms of drilling fluid additives. Examples of additives that are added to the base drilling fluid include, but are not limited to, clays, for example, bentonite; polymers, for example, starch, xanthan gum, and partially-hydrolyzed polyacrylamide (PHPA); bases, for example, calcium carbonate ($CaCO_3$), sodium carbonate ($Na_2CO_3$, soda ash); minerals, for example, barite and lime; monovalent salts, for example, sodium chloride (NaCl); and divalent salts, for example, calcium chloride ($CaCl_2$).

Although the composition can be adapted for oil-based fluids, such as for "invert" muds, drill-in fluids, synthetic-based drilling fluids, and other types of wellbore treatment fluids (muds), one or more embodiments of the disclosed lubricant composition is used in water-based drilling fluid.

In one or more embodiments, other compounds, chemicals, or ingredients can be included in the drilling fluid.

Mixture of Lubricant Composition with Drilling Fluid

A sufficient quantity of lubricant is included as part of a mud system to make a useful drilling fluid. The lubricant range may be from 0.42 gallons to 2.1 gallons of lubricant per barrel of drilling fluid. When adding a quantity of about 1.26 gallons of lubricant to fabricate a barrel of drilling fluid, a concentration of about 3% lubricant by volume in the mud system is obtained. In one or more embodiments, the lubricant comprises in a range of from about 1% to about 5% of the volume of the drilling fluid.

Method of Preparing Lubricant Composition

The lubricant composition of one or more embodiments is generally prepared by providing an alkyl-esterified fatty acids from waste vegetable oil, by providing a C8/C10 fatty acid blend, and then by mixing the C8/C10 fatty acid blend into the alkyl-esterified fatty acids from waste vegetable oil to provide a homogenized lubricant composition.

FIG. 1 depicts a block diagram showing the manufacturing process of the disclosed lubricant composition.

In one or more embodiments, the method 100 includes providing an amount of alkyl-esterified fatty acids from waste vegetable oil 108. Providing the amount of alkyl-esterified fatty acids from waste vegetable oil may include obtaining an amount of prefabricated alkyl-esterified fatty acids that originate from waste vegetable oil. In other instances, a provided waste vegetable oil 102 is converted into alkyl-esterified fatty acids. The provided waste vegetable oil is esterified 104 such that a crude alkyl-esterified fatty acids forms. The method further provides for separation of the crude alkyl-esterified fatty acids and collection of the alkyl-esterified fatty acids formed from the waste vegetable oil 106. From there, an amount of alkyl-esterified fatty acids from waste vegetable oil may be provided 108 for the lubricant composition.

In one or more embodiments, the method 100 includes providing an amount of C8/C10 fatty acid blend 156. Providing the amount of C8/C10 fatty acid blend may include obtaining an amount of prefabricated C8/C10 fatty acid blend. In other instances, the C8/C10 fatty acid blend is fabricated from a provided C8 fatty acid 150 and a provided C10 fatty acid 152. In such an instance, an amount of the provided C8 fatty acid and an amount of the provided C10 fatty acid are blended 154 until homogeneous such that a C8/C10 fatty acid blend forms. The C8/C10 blending is at a first set of conditions. In some instances, the C8 fatty acid and C10 fatty acid are blended at a temperature greater than room temperature, such as about 60° C. (in the first set of conditions). In some instances, the C8 fatty acid and C10 fatty acid are blended at a low shear rate (in the first set of conditions), with for example a mechanical or magnetic stirrer. In one or more embodiments, a low shear rate is 6 rpm or less, such as from 1 to 6 rpm, from 2 to 6 rpm, or from 3 to 6 rpm. In one or more embodiments, 55% by volume C8 fatty acid and 45% by volume C10 fatty acid (55/45 ratio) are blended at a low shear rate and 60° C. heating temperature until the C8/C10 fatty acid blend is homogenized. This blending produces a homogeneous blend, a C8/C10 fatty acid blend. From there, an amount of C8/C10 fatty acid blend may be provided 156 for a lubricant composition of one or more embodiments.

One or more embodiments of the method 100 includes providing waste vegetable oil 102, alkyl esterifying of the waste vegetable oil 103, and separating and collecting of alkyl esters of fatty acids from waste vegetable oil 106 to provide an alkyl ester of fatty acids from waste vegetable oil 108.

Further, one or more embodiments of the method 100 includes providing C8 fatty acid 150, providing C10 fatty acid 152, and blending 154 to provide a C8/C10 fatty acid blend 156.

One or more embodiments of the method 100 includes providing a lubricant 184 according to one or more embodiments. In one or more embodiments, providing the lubricant may include obtaining an amount of pre-fabricated lubricant. In one or more embodiments, an amount of alkyl-esterified fatty acids from waste vegetable oil is provided 108 and an amount of C8/C10 fatty acid blend is provided 156 and are combined 180. In one or more embodiments, the combination of the alkyl-esterified fatty acids from waste vegetable oil and C8/C10 fatty acid blend 180 are mixed until homogeneous, where the mixing 182 occurs at a second set of conditions (compared to the first set of conditions used in the previous C8/C10 blending). Thus, a homogeneous lubricant composition forms.

In one or more embodiments, the alkyl-esterified fatty acids from waste vegetable oil and the C8/C10 fatty acid blend are mixed at a temperature greater than room temperature, such as about 80° C. (in the second set of conditions). In one or more embodiments, a method includes mixing 57% by volume of waste vegetable oil ester and 33% by volume of C8/C10 fatty acid blend at a high shear rate and 80° C. heating temperature. In one or more embodiments, a high shear rate is from 6 to 600 rpm, such as from 10 to 600 rpm, from 50 to 600 rpm, and from 100 to 600 rpm. From there, an amount of lubricant 184 may be used directly or provided as a component for other compositions, such as a drilling fluid.

The lubricant provided in one or more embodiments was added to the water-based muds as shown in Tables 1 through 4 that follow. Tables 1 through 4 detail the composition and characteristics of the preparation of a clay-based bentonite mud (Table 1), a salt-free polymer-based mud (Table 2), a monovalent salt-containing polymer mud (Table 3), and a divalent salt-containing polymer mud (Table 4).

Table 1 details a formulation of a clay-based bentonite mud potentially for use in one or more embodiments.

TABLE 1

Clay-Based Bentonite Mud Composition.
Clay-Based Bentonite Mud

| Mud Components | Unit | Quantity |
| --- | --- | --- |
| water | cubic centimeters (cc) | 340.67 |
| soda ash | grams (g) | 0.25 |
| bentonite | grams (g) | 25 |
| caustic | pH~9.5-10 | amount as buffer |

The clay-based mud system is composed of fresh water, soda ash to reduce water hardness, bentonite to enhance viscosity and fluid loss behavior, and caustic component (such as NaOH or KOH) to raise the pH to about 10, and 3% of a lubricant composition.

In one or more example embodiments, "caustic" is NaOH or KOH, that is, a base that is either added in a specified amount or that is added in an amount to bring the overall (drilling) mud composition to a desired pH.

Generally, the addition of the lubricant enhances torque and drag reducing capability of drilling mud compared to a drilling mud without the lubricant, by improving the lubricity of the drilling mud.

Table 2 details a formulation of a salt-free polymer-based mud potentially for use in one or more embodiments.

TABLE 2

Salt-Free Polymer-Based Mud Composition.
Salt-Free Polymer-Based Mud

| Mud Components | Unit | Quantity |
| --- | --- | --- |
| water | cubic centimeters (cc) | 287 |
| caustic | pH~9.5-10 | amount as buffer |
| bentonite | grams (g) | 7.5 to 10 |
| starch | grams (g) | 4.0 to 6.0 |
| xanthan gum | grams (g) | 0.5 to 1.0 |
| marble F (50 µm) | grams (g) | 20 |
| marble M (150 µm) | grams (g) | 5 |
| CaCO$_3$ (50 µm) | grams (g) | 5 |
| barite | grams (g) | 66 |
| PHPA - solid | grams (g) | 1.0 to 1.5 |
| Mud Characteristics | Unit | Quantity |
| density | pound per cubic foot (lb/ft$^3$) | 77 |

The salt-free polymer-based mud system is composed of fresh water; soda ash to reduce water hardness; bentonite to enhance viscosity; starch to control fluid loss; XC polymer to improve viscosity; marble F (fine grit), marble M (medium grit), and CaCO$_3$ for bridging and minimizing formation damage; barite to enhance mud density; PHPA for enhancing viscosity and for encapsulation of cuttings; NaOH to raise the pH to about 10; and 3% of a lubricant composition.

In the examples, "starch" is a modified potato or corn starch. In the examples, marble (such as "marble F" or fine-grain marble and "marble M" or medium-grain marble) includes calcium carbonate and other components known to be found in a marble. In one or more embodiments, CaCO$_3$ is calcium carbonate alone.

Table 3 details a formulation of a monovalent salt-containing polymer mud potentially for use in one or more embodiments.

TABLE 3

Monovalent Salt-Containing Polymer Mud Composition.
Monovalent Salt-Containing Polymer Mud

| Mud Components | Unit | Quantity |
| --- | --- | --- |
| water | cubic centimeters (cc) | 277 |
| caustic | grams (g) | 0.25 to 0.5 |
| bentonite | grams (g) | 7.5 to 10 |
| starch | grams (g) | 4.0 to 6.0 |
| xanthan gum | grams (g) | 0.5 to 1.0 |
| NaCl | grams (g) | 70 |
| marble F (50 µm) | grams (g) | 20 |
| marble M (150 µm) | grams (g) | 5 |
| CaCO$_3$ (50 µm) | grams (g) | 5 |
| barite | grams (g) | 6 |
| PHPA - solid | grams (g) | 1.0 to 1.5 |
| Mud Characteristics | Unit | Quantity |
| density | pound per cubic foot (lb/ft$^3$) | 77 |

The monovalent salt-containing polymer mud is composed of fresh water; soda ash to reduce water hardness; bentonite to enhance viscosity; starch to control fluid loss; XC polymer to improve viscosity; monovalent salt, marble F, marble M, and CaCO$_3$ for bridging and minimizing formation damage; barite to enhance mud density; PHPA for enhancing viscosity and for encapsulating or coating cuttings; NaOH to raise the pH to about 10; and 3% of a lubricant composition.

Table 4 details a formulation of a divalent salt-containing polymer mud potentially for use in one or more embodiments.

TABLE 4

Divalent Salt-Containing Polymer Mud Composition.
Divalent Salt-Containing Polymer Mud

| Mud Components | Unit | Quantity |
| --- | --- | --- |
| water | cc (cubic centimeter) | 277 |
| lime (for pH) | grams (g) | 0.25 to 0.5 |
| starch | grams (g) | 4.0 to 6.0 |
| xanthan gum | grams (g) | 0.5 to 1.0 |
| CaCl$_2$ | grams (g) | 126 |
| marble F | grams (g) | 30 |
| marble M | grams (g) | 10 |
| CaCO$_3$ (50 microns) | grams (g) | 5 |
| Mud Characteristics | Unit | Quantity |
| density | pound per cubic foot (lb/ft$^3$) | 85 |

The divalent-salt containing polymer mud system is composed of fresh water; soda ash to reduce water hardness; bentonite to enhance viscosity; starch to control fluid loss; XC polymer to improve viscosity; divalent salt, marble F, marble M and CaCO$_3$ for bridging and minimizing formation damage; barite to enhance mud density; PHPA for enhancing viscosity and encapsulating cuttings; NaOH to raise the pH to about 10; and 3% of a lubricant composition.

Method of Producing Lubricant with Base Drilling Fluid

Producing a drilling fluid of one or more embodiments occurs by mixing the lubricant composition with a base fluid, such as the base fluids provided in Tables 1 to 4. In one or more embodiments, the lubricant is added after mixing the other components into the base drilling fluid. The volume of lubricant may be in a range of from about 1% to about 5% of the total volume of the drilling fluid, as previously described.

Introducing Water-Based Mud Composition into a Wellbore

In one or more embodiments, the water-based mud composition is introduced into a wellbore, where the water-based mud composition is a drilling fluid that includes the lubricant composition.

EXAMPLES

Testing of the drilling fluid of one or more embodiments and the comparative drilling fluid was conducted using an industry standard lubricity tester to determine coefficient of friction in the drilling fluid. Like drilling fluids are compared to one another. Four sets of drilling fluid types are tested to observe the effects of various lubricants in water-based drilling fluids, including the lubricant. Examples 1 to 4 and FIGS. 2 to 5 detail the experimental results of coefficients of friction in graphical format.

Four base drilling fluids are created using the lubricant of one or more embodiments. To four base drilling fluids—a base clay-based bentonite mud, a base salt-free polymer-based mud, a base monovalent salt-containing mud, and a base divalent salt-containing mud—an amount of the lubricant is added to make the drilling fluids of one or more embodiments.

Four comparative drilling fluids are created using a first comparative lubricant. To the same four base drilling fluids as previously described, an amount of a general waste vegetable oil (WVO) based lubricant composition, termed in the examples as "WVO lubricant," is added. "WVO lubricant" is found in the Society of Petroleum Engineers article (SPE-188910-MS) entitled "ARC Eco-Lube—A Food Industry Waste-Based Green Lubricant" and referred to for the composition of the WVO lubricant.

In addition, four more comparative drilling fluids are created using a second comparative lubricant. To the same four base drilling fluids as previously described, an amount of a commercial green lubricant is added. In one or more embodiments, the commercial green lubricant is Radiagreen® EME Salt Lubricant (Bri-Chem Supply Ltd.; Acheson, Canada).

Additionally, the baseline drilling fluids—the four drilling fluids without a lubricant added—are also tested. Testing the baseline drilling fluids provides a baseline coefficient of friction for different water-based mud systems to determine improvement in reduction of COF. An OFITE® Lubricity tester (OFI Testing Equipment, Inc.; Houston, USA) using known methods for testing lubricity were used to determine COF values.

Example 1

The lubricant of one or more embodiments and comparative lubricants were added separately to aliquots of the clay-based bentonite mud system of Table 1.

Initially, the components used in the clay-based bentonite mud formulation were mixed using a mud mixer. The components were added according to the order shown in Table 1 (as listed from top to bottom). An amount of the components shown in Table 1 was added to prepare the clay-based bentonite mud. Finally, lubricant was mixed into the clay-based bentonite mud to evaluate its lubricating efficiency. The mixing was performed at room temperature using a standard tabletop mixer. For this purpose, a resultant coefficient of friction was measured for the different drilling fluid compositions using the OFITE® Lubricity tester as previously described. The lubricity test was performed at room temperature.

Figure 2:
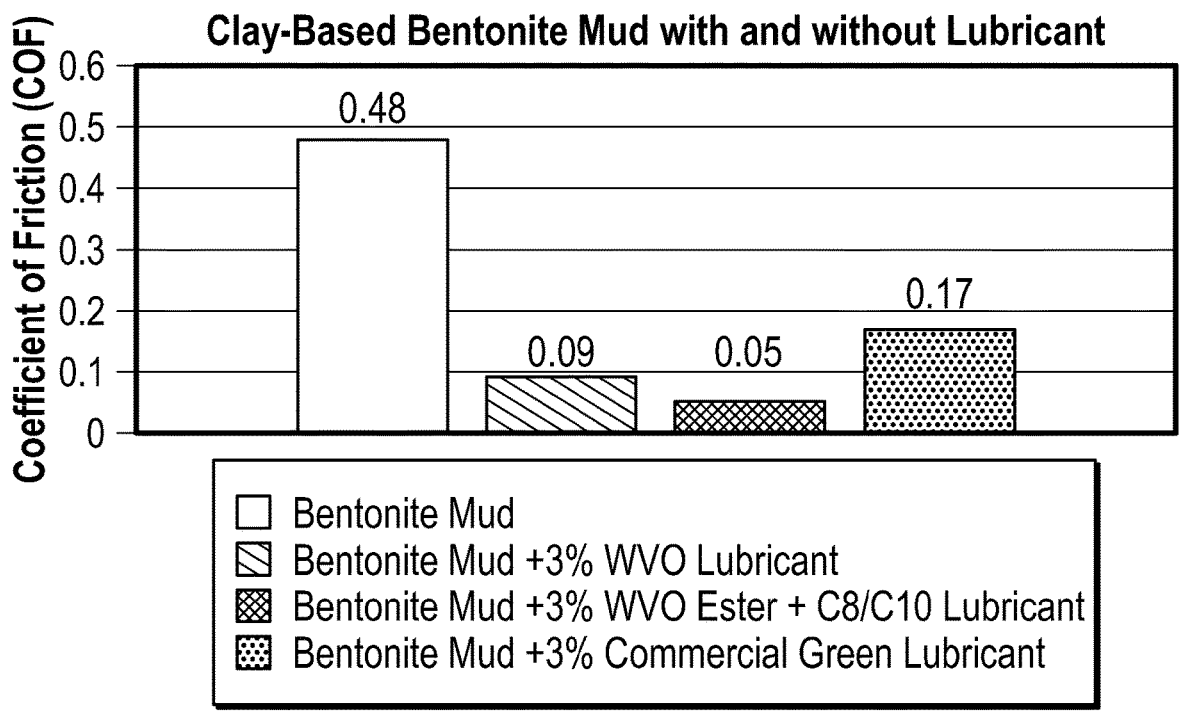
FIG. 2 provides a chart showing coefficients of friction (COF) of clay-based bentonite muds with and without various lubricants, including lubricant of one or more embodiments.

FIG. 2 shows the effect of the lubricant including WVO ester and C8/C10 fatty acid blend of one or more embodiments, the WVO lubricant, and the commercial green lubricant on the lubricity enhancement of a clay-based bentonite mud. The lubricants exhibit varying coefficients of friction relating to a lubricating effect from a baseline coefficient of friction of the clay-based bentonite mud system without any lubricant added. Even without a dedicated lubricant, a drilling fluid will show a modicum of lubrication effect.

Clay-based bentonite mud itself provides a baseline coefficient of friction of 0.48. Clay-based bentonite mud with a 3% by volume concentration of the commercial green lube provided a 0.17 coefficient of friction. Clay-based bentonite mud with a 3% by volume concentration of the WVO lubricant provided a 0.09 coefficient of friction. Clay-based bentonite mud with a 3% by volume concentration of the WVO ester and C8/C10 fatty acid blend lubricant provided a 0.05 coefficient of friction.

The drilling fluids tested exhibited more than 60% reduction in coefficient of friction compared to the baseline clay-based bentonite mud. The drilling fluid containing commercial green lube displayed a 64.6% reduction in coefficient of friction compared to the baseline clay-based bentonite mud. The drilling fluid containing a WVO lubricant displayed an 81.3% reduction in coefficient of friction compared to the baseline clay-based bentonite mud. The drilling fluid containing the WVO ester and C8/C10 fatty acid blend lubricant displayed an 89.6% reduction in coefficient of friction compared to the baseline clay-based bentonite mud.

Example 2

The lubricant of one or more embodiments and comparative lubricants were added separately to aliquots of the salt-free polymer-based mud system of Table 2. A resultant coefficient of friction was measured for the different drilling fluid compositions.

The mixing and the testing of the salt-free polymer-based mud formulations were similar in process and conditions to the mixing and testing of the clay-based bentonite mud, except for the differences in formulation as given in Table 2.

Figure 3:
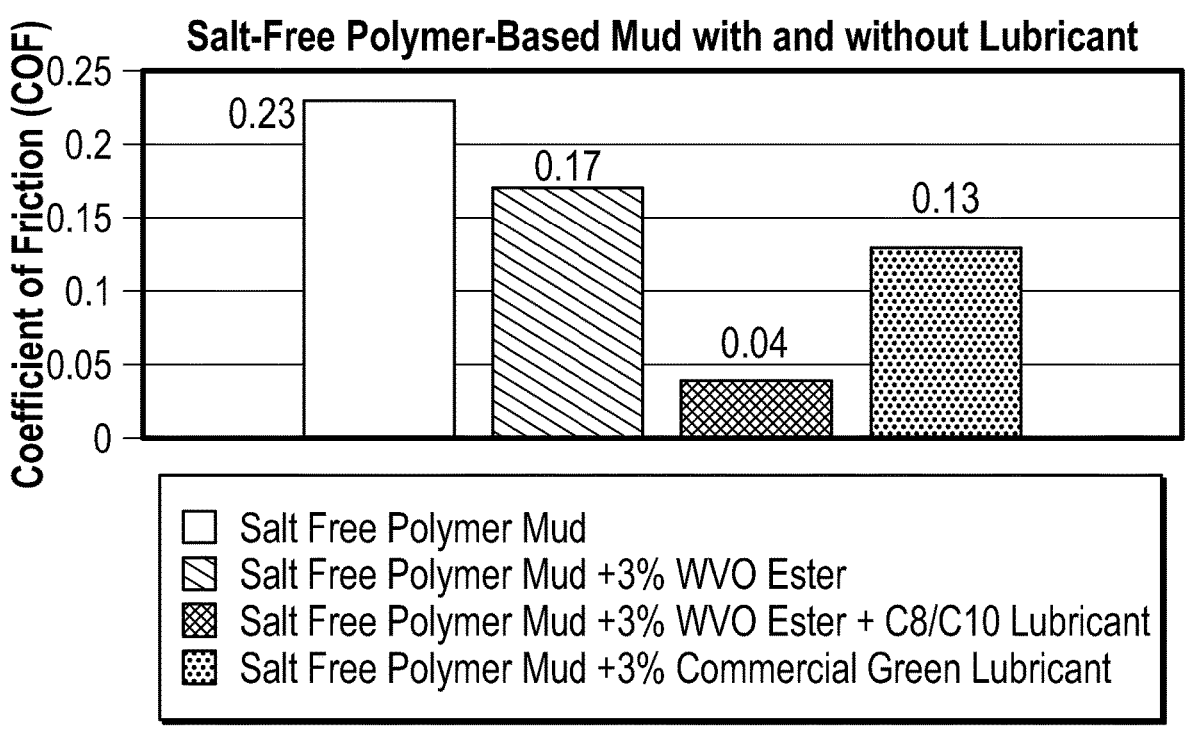
FIG. 3 provides a chart showing coefficients of friction of salt-free polymer-based muds with and without various lubricants, including lubricant of one or more embodiments.

FIG. 3 shows the effect of the lubricant including WVO ester and C8/C10 fatty acid blend of one or more embodiments, the WVO lubricant, and the commercial green lubricant on the lubricity enhancement of a salt-free polymer-based mud. The lubricants exhibit varying coefficients of friction, relating to a lubricating effect, from a baseline coefficient of friction of the salt-free polymer-based mud system without any lubricant added.

Salt-free polymer-based mud itself provides a baseline coefficient of friction of 0.23. Salt-free polymer-based mud with a 3% by volume concentration of the commercial green lube provided a 0.13 coefficient of friction. Salt-free polymer-based mud with a 3% by volume concentration of the WVO lubricant provided a 0.17 coefficient of friction. Salt-free polymer-based mud with a 3% by volume concentration of the WVO ester and C8/C10 fatty acid blend lubricant provided a 0.04 coefficient of friction.

The drilling fluids tested exhibited more than 25% reduction in coefficient of friction compared to the baseline salt-free polymer-based mud. The drilling fluid containing commercial green lube displayed a 43.5% reduction in coefficient of friction compared to the baseline salt-free polymer-based mud. The drilling fluid containing WVO lubricant displayed a 26.1% reduction in coefficient of friction, compared to the salt-free polymer-based mud by itself. The drilling fluid containing WVO ester and C8/C10 fatty acid blend lubricant displayed an 82.6% reduction in coefficient of friction compared to the baseline salt-free polymer-based mud.

Example 3

The lubricant of one or more embodiments and comparative lubricants were added separately to aliquots of the monovalent salt-containing mud system of Table 3. A resultant coefficient of friction was measured for the different drilling fluid compositions.

The mixing and the testing of the monovalent salt-containing polymer formulations were similar in process and conditions to the mixing and testing of the clay-based bentonite mud, except for the differences in formulation as given in Table 3.

Figure 4:
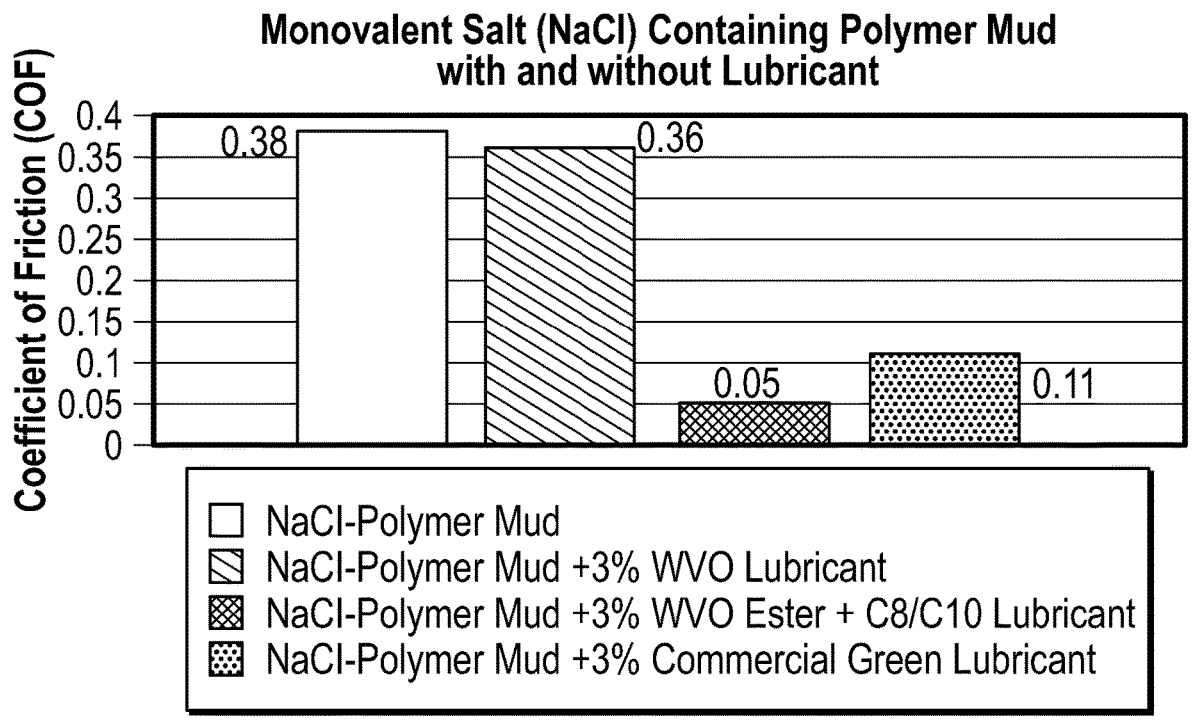
FIG. 4 provides a chart showing coefficients of friction of monovalent salt-containing muds with and without various lubricants, including lubricant of one or more embodiments.

FIG. 4 shows the effect of the lubricant including WVO ester and C8/C10 fatty acid blend of one or more embodiments, the WVO lubricant, and the commercial green lubricant on the lubricity enhancement of a monovalent salt-containing polymer-based mud. Sodium chloride (NaCl) is the monovalent salt used in the monovalent salt-containing polymer-based mud of Example 3. The lubricants exhibit varying coefficients of friction, relating to a lubricating effect, from a baseline coefficient of friction of the monovalent salt-containing polymer-based mud system without any lubricant added.

Monovalent salt (NaCl) containing polymer-based mud itself provides a baseline coefficient of friction of 0.38. Monovalent salt (NaCl) containing polymer-based mud with a 3% by volume concentration of the commercial green lubricant provided a 0.11 coefficient of friction. Monovalent salt (NaCl) containing polymer-based mud with a 3% by volume concentration of the WVO lubricant provided a 0.36 coefficient of friction. Monovalent salt (NaCl) containing polymer-based mud with a 3% by volume concentration of the WVO ester and C8/C10 fatty acid blend lubricant provided a 0.05 coefficient of friction.

The drilling fluids tested exhibited more than 5% reduction in coefficient of friction compared to the baseline monovalent salt (NaCl) containing polymer-based mud. The drilling fluid containing commercial green lubricant displayed a 71.1% reduction in coefficient of friction compared to the baseline monovalent salt (NaCl) containing polymer-based mud by itself. The drilling fluid containing WVO lubricant displayed a 5.3% reduction in coefficient of friction compared to the monovalent salt (NaCl) containing polymer-based mud by itself. The drilling fluid containing WVO ester and C8/C10 fatty acid blend lubricant displayed an 86.8% reduction in coefficient of friction compared to the monovalent salt (NaCl) containing polymer-based mud by itself.

Example 4

The lubricant of one or more embodiments and comparative lubricants were added separately to aliquots of the divalent salt-containing mud system of Table 4. A resultant coefficient of friction was measured the different drilling fluid compositions.

The mixing and the testing of the divalent salt-containing mud formulations were similar in process and conditions to the mixing and testing of the clay-based bentonite mud, except for the differences in formulation as given in Table 3.

Figure 5:
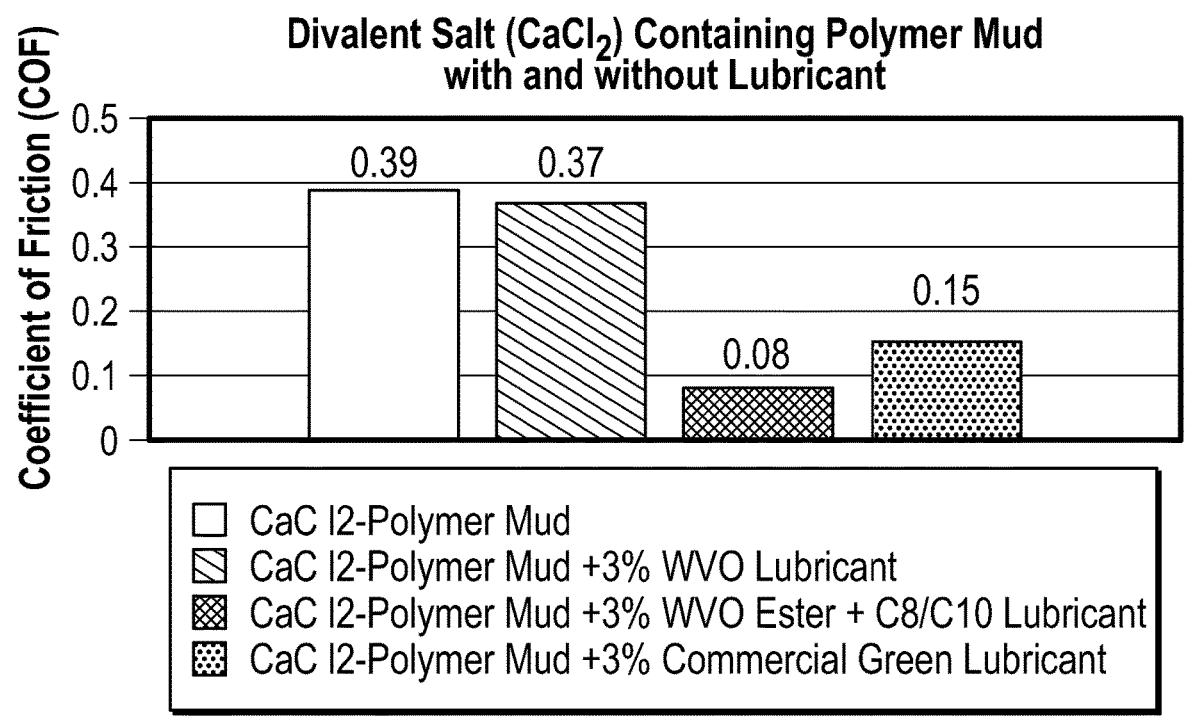
FIG. 5 provides a chart showing coefficients of friction of divalent salt-containing muds with and without various lubricants, including lubricant of one or more embodiments.

FIG. 5 shows the effect of the lubricant including WVO ester and C8/C10 fatty acid blend of one or more embodiments, the WVO lubricant, and the commercial green lubricant on the lubricity enhancement of a divalent salt-containing polymer-based mud. Calcium chloride ($CaCl_2$) is the divalent salt used in the divalent salt-containing polymer-based mud of Example 4. The lubricants exhibit varying coefficients of friction, relating to a lubricating effect, from a baseline coefficient of friction of the divalent salt-containing polymer mud system without any lubricant added.

Divalent salt ($CaCl_2$) containing polymer-based mud by itself provided a baseline coefficient of friction of 0.39. Divalent salt ($CaCl_2$) containing polymer-based mud with a 3% by volume concentration of the commercial green lubricant provided a 0.15 coefficient of friction. Divalent salt ($CaCl_2$) containing polymer-based mud with a 3% by volume concentration of the WVO lubricant provided a 0.37 coefficient of friction. Divalent salt ($CaCl_2$) containing polymer-based mud with a 3% by volume concentration of the WVO ester and C8/C10 fatty acid blend lubricant provided a 0.08 coefficient of friction.

The drilling fluids tested exhibited more than 5% reduction in coefficient of friction compared to the baseline divalent salt ($CaCl_2$) containing polymer-based mud. The drilling fluid containing the commercial green lubricant displayed a 61.5% reduction in coefficient of friction compared to the baseline divalent salt ($CaCl_2$) containing polymer-based mud. The drilling fluid containing the WVO lubricant displayed a 5.1% reduction in coefficient of friction compared to the baseline divalent salt ($CaCl_2$) containing polymer-based mud. The drilling fluid containing WVO ester and C8/C10 fatty acid blend lubricant of one or more embodiments displayed a 79.5% reduction in coefficient of friction compared to the baseline divalent salt ($CaCl_2$) containing polymer-based mud.

Overall, the lubricant containing WVO ester and C8/C10 fatty acid blend of one or more embodiments demonstrated the greatest reduction in coefficient of friction compared to the lubricant(s) tested in the respective drilling fluids. Thus, the lubricant containing WVO ester and C8/C10 fatty acid blend of one or more embodiments was found to have the greatest coefficient of reduction performance in the clay-based bentonite mud, salt-free polymer-based mud, monovalent salt-containing polymer mud, and divalent salt-containing polymer mud.

Between the drilling fluids with the lubricants tested in clay-based bentonite muds, the drilling fluid with the WVO lubricant showed intermediate performance and the drilling fluid with the commercial green lubricant showed the lowest performance. "Lowest performance" means the lowest reduction in coefficient of friction compared to the group of one or more lubricant tested in the respective drilling fluid(s). The data demonstrated that lubricant containing WVO ester and C8/C10 fatty acid blend of one or more embodiments in the drilling fluid demonstrated the greatest performance, and that is suitable for monovalent salt-containing water-based drilling muds. "Greatest performance" means the greatest reduction in coefficient of friction compared to the group of one or more lubricant tested in the respective drilling fluid(s).

Between the drilling fluids with the lubricants tested in salt-free polymer-based muds, the drilling fluid with the commercial green lubricant showed intermediate performance and the drilling fluid with the WVO lubricant showed the lowest performance. The data demonstrated that lubricant containing WVO ester and C8/C10 fatty acid blend of one or more embodiments in the drilling fluid demonstrated the greatest performance, and that is suitable for monovalent salt-containing water-based drilling muds.

Between the drilling fluids with the lubricants tested in monovalent salt-containing polymer muds, the drilling fluid with the commercial green lubricant showed intermediate performance and the drilling fluid with the WVO lubricant showed the lowest performance. The data demonstrated that lubricant containing WVO ester and C8/C10 fatty acid blend of one or more embodiments in the drilling fluid demonstrated the greatest performance, and that is suitable for monovalent salt-containing water-based drilling muds.

Between the drilling fluids with the lubricants tested in divalent salt-containing polymer muds, the drilling fluid with the commercial green lubricant showed intermediate performance and the drilling fluid with the WVO lubricant showed the lowest performance. The data demonstrated that lubricant containing WVO ester and C8/C10 fatty acid blend of one or more embodiments in the drilling fluid demonstrated the greatest performance, and that is suitable for divalent salt-containing water-based drilling muds.

Unless defined otherwise, technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C.

Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and grammatical variations thereof are intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" is used, this term may mean that there can be a variance in value of up to ±10%, of up to 5%, of up to 2%, of up to 1%, of up to 0.5%, of up to 0.1%, or up to 0.01%.

The term "substantially" as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it should be understood that another embodiment is from the one particular value to the other particular value, along with values and combinations thereof within the range.

Although a few examples and embodiments have been described in detail, those skilled in the art will readily appreciate that many modifications are possible in the examples and embodiments without materially departing from this disclosure. Modifications of one or more embodiments disclosed are intended to be included within the scope of this disclosure as defined in the following claims. In the claims, means-plus-function clauses are intended to cover the structures previously described as performing the recited function, including structural equivalents and equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed:

1. A lubricant comprising a mixture of:
   alkyl-esterified fatty acids from waste vegetable oil; and
   a C8/C10 fatty acid blend comprising a caprylic fatty acid (C8) and a capric fatty acid (C10),
   wherein the mixture has an acid content of less than about 1.5 mg KOH/g of the mixture (milligram of potassium hydroxide per gram of the mixture of the alkyl-esterified fatty acids and the C8/C10 fatty acid blend).

2. The lubricant of claim 1, wherein the alkyl-esterified fatty acids from the waste vegetable oil is at a volume percent in a range of from about 50% to about 90% of the lubricant.

3. The lubricant of claim 1, wherein the C8/C10 fatty acid blend is at a volume percent in a range of from about 10% to about 50% of the lubricant.

4. The lubricant of claim 1, wherein the caprylic fatty acid (C8) is in a range of from about 50% by volume to about 60% by volume of the C8/C10 fatty acid blend.

5. The lubricant of claim 1, wherein the capric fatty acid (C10) is in a range of from about 40% by volume to about 50% by volume of the C8/C10 fatty acid blend.

6. The lubricant of claim 1, wherein the waste vegetable oil is a recycled waste vegetable oil.

7. The lubricant of claim 1, wherein the mixture has a viscosity in a range of from about 1 centistoke (cSt) to about 20 cSt at 60° C.

8. The lubricant of claim 1, wherein the mixture has a moisture content of less than about 1%.

9. The lubricant of claim 1, wherein the C8/C10 fatty acid blend is homogenized.

10. A method of preparing a lubricant, comprising:
providing alkyl-esterified fatty acids from waste vegetable oil;
providing a C8/C10 fatty acid blend, comprising a caprylic fatty acid (C8) and a capric fatty acid (C10); and
mixing the C8/C10 fatty acid blend into the alkyl-esterified fatty acids from the waste vegetable oil such that a homogeneous lubricant composition forms,
wherein the homogenous lubricant composition has an acid content of less than about 1.5 mg KOH/g of the alkyl-esterified fatty acids and the C8/C10 fatty acid blend.

11. The method of claim 10, wherein the C8/C10 fatty acid blend is a homogeneous blend provided by blending at low shear of 6 rpm or less and 60° C. heating temperature,
wherein the C8/C10 fatty acid blend is at a volume percent in a range of from about 10% to about 50% of the lubricant,
wherein the caprylic fatty acid (C8) is in a range from about 50% to about 60% by volume of the C8/C10 fatty acid blend,
wherein the capric fatty acid (C10) is in a range from about 40% to about 50% by volume of the C8/C10 fatty acid blend, and
wherein the alkyl-esterified fatty acids from waste vegetable oil is at a volume percent in a range of from about 50% to about 90% of the lubricant.

12. The method of claim 10, wherein the mixing occurs at a shear rate in a range of from 1 to 6 rpm, and at a temperature of about 80° C.

13. A water-based mud, comprising:
an aqueous base solution; and
a lubricant composition, where the lubricant composition comprises a mixture of a fatty acid blend and alkyl-esterified fatty acids from waste vegetable oil, and where the fatty acid blend comprises caprylic fatty acid (C8) and a capric fatty acid (C10),
wherein the mixture of the fatty acid blend and the alkyl-esterified fatty acids has an acid content of less than about 1.5 mg KOH/g of the mixture.

14. The water-based mud of claim 13, where the lubricant composition is present in a range of from about 1% to 5% by volume of the water-based mud.

15. The water-based mud of claim 13, where the aqueous base solution is selected from the group consisting of a clay-based bentonite mud, a salt-free polymer-based mud, a monovalent salt-containing polymer mud, and a divalent salt-containing polymer mud.

16. The water-based mud of claim 13, further comprising an additive, where the additive is selected from the group consisting of a polymer, an acid, a base, a mineral, a clay, a salt, and combinations thereof.

17. The water-based mud of claim 13, where the aqueous base solution has a coefficient of friction and the water-based mud has a coefficient of friction, and where the coefficient of friction for the water-based mud is at least 75% less than the coefficient of friction for the aqueous base solution.

18. The water-based mud of claim 13, where the aqueous base solution has a coefficient of friction and the water-based mud has a coefficient of friction, and where the coefficient of friction for the water-based mud is at least 79% less than the coefficient of friction for the aqueous base solution.

19. A method of preparing a water-based mud, comprising:
providing an aqueous base solution;
providing a lubricant composition, comprising alkyl-esterified fatty acids from waste vegetable oil and a fatty acid blend, where the fatty acid blend comprises caprylic fatty acid (C8) and a capric fatty acid (C10); and
mixing the aqueous base solution and the lubricant composition such that the water-based mud forms,
wherein the lubricant composition has an acid content of less than about 1.5 mg KOH/g of the alkyl-esterified fatty acids and the fatty acid blend.

20. A method of using a water-based mud, comprising:
introducing into a wellbore the water-based mud comprising a lubricant composition, where the water-based mud comprises an aqueous base solution and the lubricant composition, where the lubricant composition comprises alkyl-esterified fatty acids from waste vegetable oil and a fatty acid blend, and where the fatty acid blend comprises a caprylic fatty acid (C8) and a capric fatty acid (C10),
wherein the lubricant composition has an acid content of less than about 1.5 mg KOH/g of the alkyl-esterified fatty acids and the fatty acid blend.

* * * * *